(12) United States Patent
Carof (10) Patent No.: US 7,483,336 B2
(45) Date of Patent: Jan. 27, 2009

(54) DEVICE FOR AVOIDING OBSTACLES FOR HIGH-SPEED MULTI-HULLED WATERCRAFT

(75) Inventor: Alain Carof, La Colle S/Loup (FR)

(73) Assignee: Thales (FR)

( * ) Notice: Subject to any disclaimer, the term of this patent is extended or adjusted under 35 U.S.C. 154(b) by 143 days.

(21) Appl. No.: 10/583,265

(22) PCT Filed: Nov. 5, 2004

(86) PCT No.: PCT/EP2004/052819

§ 371 (c)(1),
(2), (4) Date: Jun. 16, 2006

(87) PCT Pub. No.: WO2005/069038

PCT Pub. Date: Jul. 28, 2005

(65) Prior Publication Data

US 2007/0223311 A1 Sep. 27, 2007

(30) Foreign Application Priority Data

Dec. 19, 2003 (FR) .................................. 03 15028

(51) Int. Cl.
*G01S 15/60* (2006.01)
*G01S 15/87* (2006.01)
*G01S 15/93* (2006.01)

(52) U.S. Cl. .......................... 367/99; 367/127; 367/129

(58) Field of Classification Search .................... 367/90, 367/94, 117, 124, 127, 129, 138; 342/29.41, 342/99, 129, 140, 146

See application file for complete search history.

(56) References Cited

U.S. PATENT DOCUMENTS 3,623,444 A * 11/1971 Lang ........................... 114/277

(Continued)

FOREIGN PATENT DOCUMENTS

JP 60214283 A * 10/1985

OTHER PUBLICATIONS

Carof A H: "Acoustic differential delay and Doppler tracking system for long range AUV positioning and guidance" Oceans '94 Sep. 13, 1994.

(Continued)

*Primary Examiner*—Thomas H Tarcza
*Assistant Examiner*—Lisa Yung
(74) *Attorney, Agent, or Firm*—Lowe Hauptman Ham & Berner, LLP (57) ABSTRACT

One or more embodiments of the present invention are aimed at a device for ships, in particular for multihull ships and high-speed multihull ships making it possible to avoid obstacles, in particular obstacles submerged at low depth. In at least one embodiment, the device according to the invention comprising at least: two transmitters of acoustic waves spaced apart from one another and transmitting waves of distinct frequencies or of different waveforms, an acoustic receiver, whose reception band is suitable for the emission frequencies of the transmitters, means of processing of the received signals, these means performing, through the echoes received, a measurement of the difference of the propagation times and a measurement of the differential Doppler frequency of the waves transmitted by each of the transmitters; these processing means thus determining from these measurements the position of and object having returned an echo.

9 Claims, 5 Drawing Sheets

U.S. PATENT DOCUMENTS

| | | | | |
|---|---|---|---|---|
| 3,673,553 A | * | 6/1972 | Miura et al. | 367/89 |
| 3,832,709 A | * | 8/1974 | Klein et al. | 342/127 |
| 3,886,487 A | * | 5/1975 | Walsh et al. | 367/92 |
| 4,290,043 A | * | 9/1981 | Kaplan | 340/984 |
| 4,559,621 A | * | 12/1985 | Delignieres | 367/130 |
| 5,160,931 A | * | 11/1992 | Brown | 342/25 C |

2003/0222778 A1    12/2003    Piesinger

OTHER PUBLICATIONS

Chestnut P C : Emitter Location Accuracy Using TDOA and Differential Doppler Mar. 2, 1982 New York.

* cited by examiner

DEVICE FOR AVOIDING OBSTACLES FOR HIGH-SPEED MULTI-HULLED WATERCRAFT

CROSS-REFERENCE TO RELATED APPLICATIONS

The present Application is based on International Application No. PCT/EP2004/052819, filed on Nov. 5, 2004, which in turn corresponds to FR 03/15028 filed on Dec. 19, 2003, and priority is hereby claimed under 35 USC §119 based on these applications. Each of these applications are hereby incorporated by reference in their entirety into the present application.

FIELD OF THE INVENTION

The present invention is aimed at a device for avoiding obstacles, in particular obstacles submerged at low depth, intended in particular for multihull ships and especially for high-speed multihull ships. By performing early detection of the echos originating from objects situated on the route of the ship, the device allows in particular the crew of the ship to make provisions to alter the heading so as to avoid these objects.

BACKGROUND OF THE INVENTION

The growing increase in the speed of ships and in the frequenting of certain maritime routes renders evermore obvious the problem posed by the drifting on the sea of floating objects which may be located on the route of ships. To be of some effectiveness, the detection of these objects and their location must be early enough to possibly allow the crew of-the ship to alter the heading so as to avoid these objects. Insofar as the ship is moving, the important parameter is here the relative position of the object detected with respect to the ship. It may also be useful to know in a relatively precise manner if the detected object is floating on the surface or else if it is submerged, its submersion depth.

To perform the detection of floating objects there exist several types of devices using mainly electromagnetic sensors such as radars, optical sensors using visible or infrared wavelengths or else laser sensors. These devices are effective for detecting floating or very slightly submerged objects, in particular when the sea is fairly calm. On the other hand, if the floating object is of a relatively small size, and if the sea is heavy the effectiveness of the electromagnetic sensors very substantially decreases. Likewise their effectiveness decreases rapidly if the depth of submersion of the object increases, as in the illustration of FIG. 1. The effectiveness of the electromagnetic sensors 10 is moreover affected by the incidence of the direction of emission with respect to the surface of the water. Specifically, when we seek to increase the detection range so as to adapt it to the requirements of high-speed ships, the electromagnetic wave 11 is often transmitted in a grazing manner with a small angle of incidence with respect to the surface of the sea, the angle of incidence then becoming close to the limit angle corresponding to the total reflection on the surface of the sea of the transmitted wave. In a rough sea, the performance of these devices is furthermore impaired by the waves.

Figure 1:
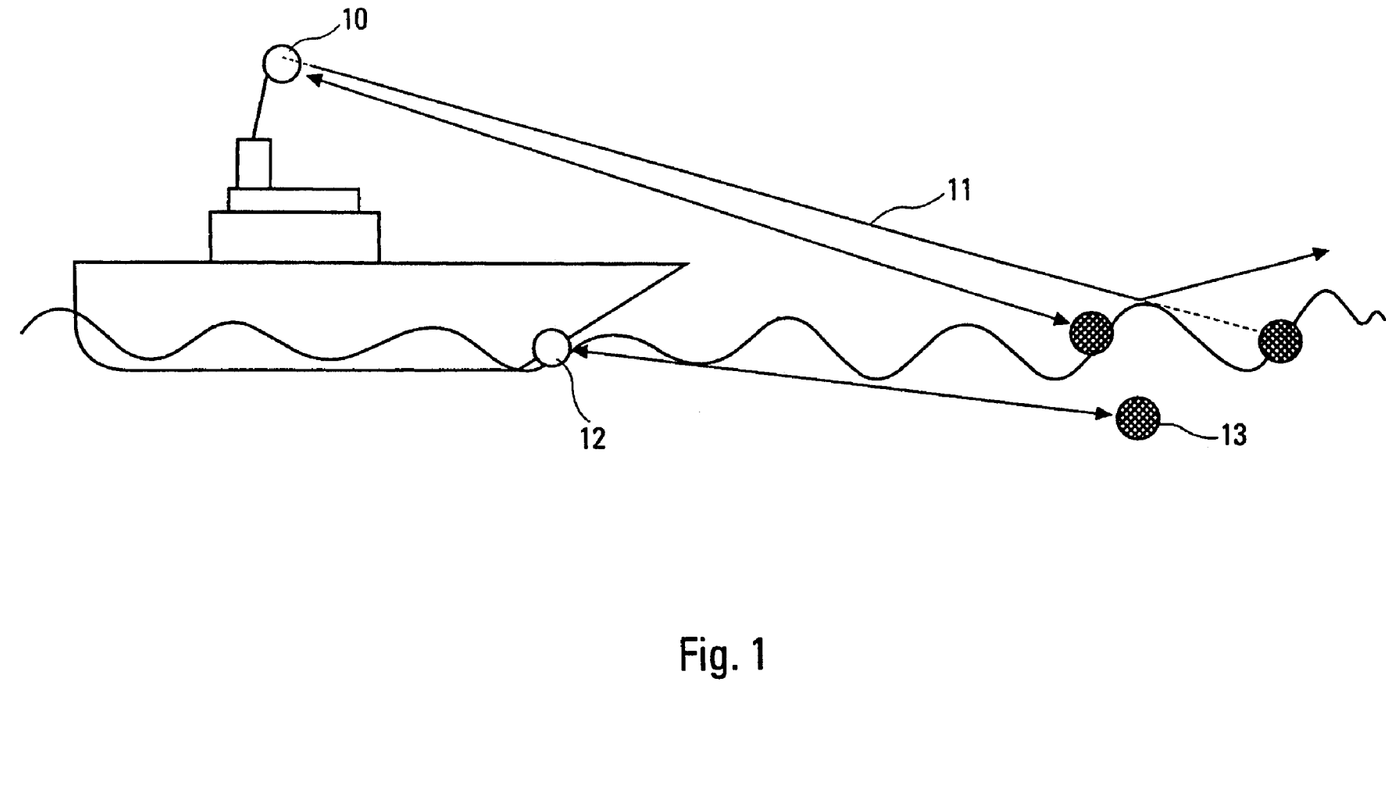
FIG. 1, a diagrammatic representation of the device according to one of the embodiments of the present invention installed at the bow of a ship.

To alleviate the problems related to electromagnetic sensors, it is known to use acoustic sensors 12, such as active sonars, which make it possible to detect obstacles, including submerged objects 13. However, the utilization of the properties of the acoustic waves such as it is carried out in the devices known to the prior art, is unsuitable for high-speed ships. Specifically, these ships exhibit particular structural characteristics such as in particular the existence of a hull made of several very slender floats. Moreover, the means for detecting these high-speed ships undergo the nonnegligible influence of the Doppler effect engendered by their own speed.

For high-speed ships, the detection and the location of objects must then involve several parameters such as the emission frequency of the acoustic waves, the shape of the transmitted waves, the dimensions of the antenna, and the Doppler effect consequent upon the speed of the ship. These various parameters are not systematically used by the existing devices.

It is known that for a linear antenna for example, the angular resolution of the measurement performed is given by a formula of the type:

$$\theta_3 = k.\lambda/L \quad [1]$$

where:
$\theta_3$ is the aperture of the main lobe of the antenna at −3 dB,
$\lambda$ is the wavelength of the acoustic wave given by $\lambda=c/f$, where c represents the propagation speed of the wave in the medium considered (sea water or fresh water for example) and f the frequency of the acoustic wave,
L is the length of the antenna,
K is a coefficient in particular related to the form of the antenna and to the weighting function used for the lobes.
k can in particular take a value lying between 0.9 and 1.5.

Relation [1] demonstrates that $\theta_3$ is dependent on the frequency of the transmitted wave, as well as the length of the antenna.

For a high-speed ship, it is desirable to have at one and the same time a fairly long range, and a sufficient angular accuracy so as to be able to determine in an early and accurate manner the position of the objects present on the route of the ship.

Satisfying the accuracy requirement prompts one to choose, in accordance with relation [1], a relatively high emission frequency associated with an antenna of large size. However, it is known that the absorption coefficient of acoustic waves is dependent on the frequency of the transmitted wave or more precisely on the inverse of the square of the frequency. Stated otherwise, the higher the transmission frequency is and the more the range is limited, the transmitted power being otherwise constant. The range requirement therefore leads to a choice of emission at relatively low frequency. The duality of these two requirements culminates finally in the search for a compromise.

In the particular case of a multihull ship, the compromise turns out to be more difficult to find than for a conventional ship. The hydrodynamic constraints of such craft make it essential in particular to reduce anything that may affect the drag of the hulls and in particular the size of the antennas. The slenderness of the floats does not furthermore make it possible to have available an antenna of satisfactory size to ensure the desired directivity. It is possible nevertheless to alleviate this handicap by using a system of antennas of low dimensions comprising for example, at emission or at reception, two or more antennas. Each antenna can be placed on a distinct hull. An array of antennas is thus produced. It is necessary however in this case to take into account the occurrence, in addition to the main lobe, of spurious image lobes. These spurious lobes also called array lobes are induced by the distance which separates the floats on which the antennas are disposed. This spacing, very large compared with the wavelength of the acoustic signal, leads to a spatial undersampling of the received signal which induces the occurrence of the array lobes. The result is the existence of an ambiguity as to the direction of arrival of the signal back-scattered by a floating object.

The detection of floating objects by high-speed ships is furthermore affected by the Doppler effect which intervenes in a nonnegligible manner in the propagation of the signals and the reception of the echos. The Doppler effect must be taken into account if one wishes to undertake correct determination of the position of floating objects.

For a ship carrying A transmitter and a receiver, the transmitter transmitting a wave reflecting on a floating object, subjected to a simple drift motion due to the currents or to a relatively weak wind, the Doppler effect is simply related especially due to the displacement of the ship. In this case, it is possible as a first approximation to write:

$$f_{received} \cong f_{transmitted}(1+(2/c).v_{ship}.\cos g) \quad [2]$$

where g represents the bearing in-which the object lies with respect to the heading of the ship. The bearing is determined with respect to the direction of the speed vector of the ship which is taken as reference. It is also the angle relative to the axis of the antenna.

In expression [2], the Doppler is represented by the expression $(2/c).v_{ship}.\cos g$. This quantity characterizes the frequency slip observed on reception with respect to the transmitted frequency, slip due to the Doppler effect. The coefficient 2 results from the fact that the wave transmitted by the sonar situated on the ship and reflected by the submerged object undergoes the Doppler effect on the outward-return path.

For a ship comprising an transmitter and a receiver placed at the same location on the ship, the effect of the motion of the ship manifests itself by a difference of duration between the path traveled by the acoustic wave transmitted between the transmitter and the floating object, and the path traveled by the acoustic wave reflected between the floating object and the receiver. This difference of duration is mainly due to the displacement of the ship during the propagation of the wave. If the ship is approaching the return path turns out shorter. Conversely, if the ship is receding this path turns out to be longer.

The Doppler effect manifests itself on the signal, according to each case, by a compression or a dilatation of the time, in the identical ratio v/c on the outward leg and on the return leg of the wave. With active sonar the estimation of the Doppler is generally carried out by performing the inter-correlation of the received signal with models of the transmitted signal which are affected by a Doppler effect. This estimation can also be carried out by an interspectral analysis, by considering that for certain signals, as was signaled above, the measurement of a frequency slip may be sufficient itself. It is also possible to measure the compression of the time between two pulses received with respect to the interval between the two corresponding transmissions.

The detection of objects and the accurate determination of their positions are often complicated by the reverberation originating from scatterers distributed in the space and which will affect the useful signal to reverberation ratio. This reverberation will be all the more annoying the swifter the ship moves and the larger the spatial undersampling thereby causing spurious lobes.

SUMMARY OF THE INVENTION

An aim of the invention presented in this document is in particular to alleviate the difficulties encountered during the determination of the position of objects with respect to a high-speed ship. Another aim consists in circumventing the ambiguity due to the spurious lobes and to the reverberation. For this purpose the latter is aimed at an acoustic device for detecting floating or submerged objects, intended in particular for high-speed multihull ships and allowing the avoidance of these objects. The structure of this device comprises at least:

two transmitters of acoustic signals spaced apart from one another, for example disposed on different hulls, an acoustic receiver disposed on one of the hulls, whose reception band is suitable for the waves transmitted by the transmitter, means of processing of the received signals making it possible to determine the position of at least one floating or submerged object on the basis of the echos returned by this object. These means utilize the Doppler differences existing between the reflected signals corresponding to one and the same echo and consequent upon the transmission of each of the transmitters.

In the preferred embodiment the acoustic frequencies or the waveforms transmitted are distinct.

In the preferred embodiment, when the ship is still distant and the Doppler differential is not significant to the accuracy of the measurements, the position it can firstly be determined in a coarse manner on the basis of the simple measurement of the time deviation T separating the instants of arrival on the receiver of the waves transmitted by each of the transmitters and reflected by the object.

The processing performed thus exhibits the advantage of allowing a first determination, coarse but early, of the position of the object having returned an echo. This preliminary processing also advantageously makes it possible to simplify the processing by analysis of the Doppler frequency deviation.

On account of the reciprocity of the propagation, the device according to the invention exhibits the advantage of being able to be embodied in a dual manner by for example adopting a structure comprising a single transmitter and two receivers. In a preferred embodiment, for this configuration we choose also to transmit two different signals.

BRIEF DESCRIPTION OF THE DRAWINGS

Other characteristics and advantages shall appear through the description and FIGS. 1 to 5, which represent.

DETAILED DESCRIPTION

Figure 2:
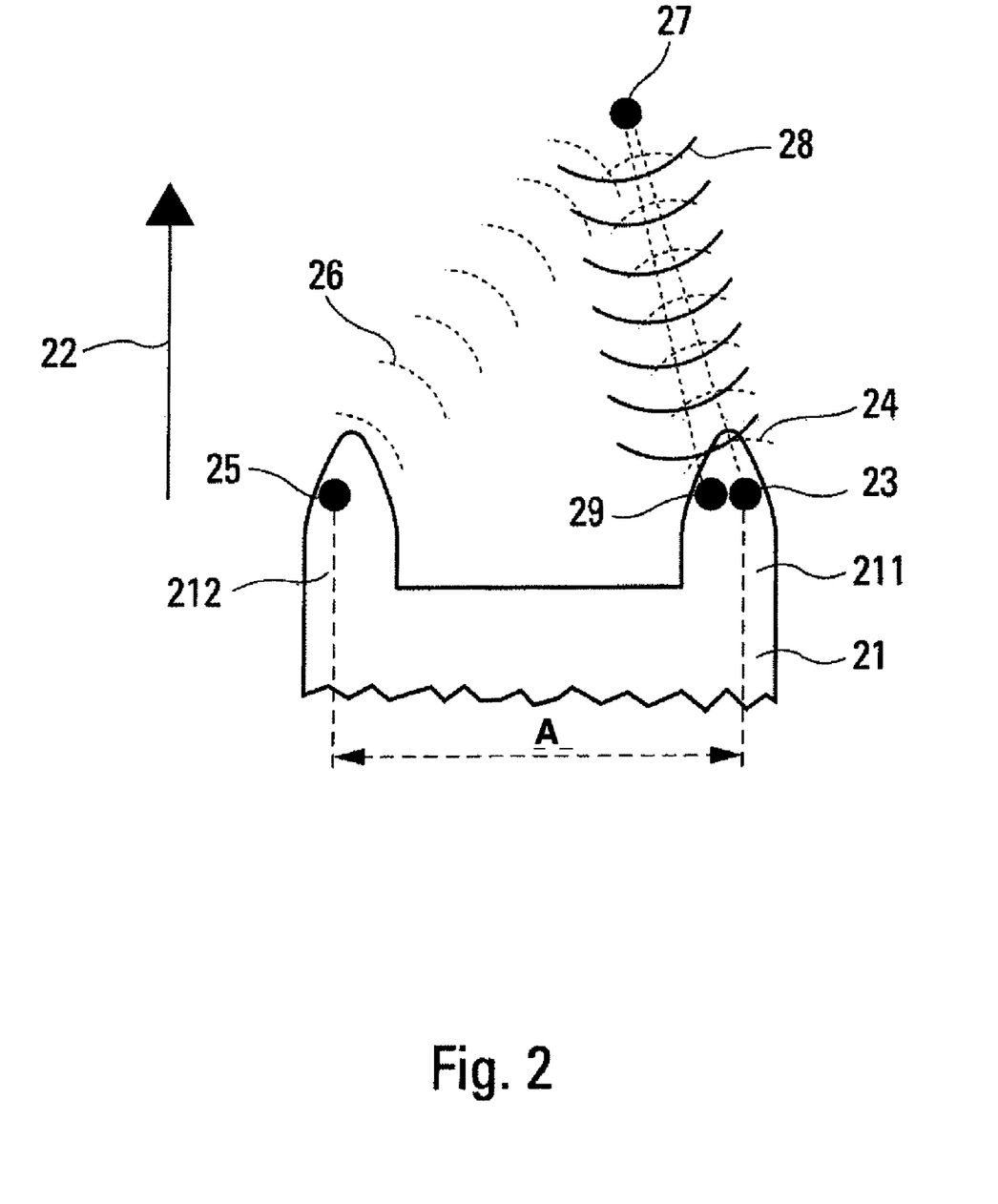
FIG. 2, a diagrammatic representation of the device according to the invention installed at the bow of a ship with two hulls.

FIG. 2 presents in a diagrammatic manner a form of possible layout of a preferred embodiment of the device according to the invention.

In the example illustrated by FIG. 2, the device equips a ship with two hulls 21. The figure presents only the bow part of the ship and in particular the bow part of the two hulls. The arrow 22 materializes the progression of the ship which is steering towards the object 27. This object is for example an object submerged at low depth and which thus evades radar detection.

At the bow of one of the hulls 211 is positioned a sonar transmitter 23 transmitting an acoustic wave 24. Likewise, at the bow of the other hull 212 is positioned a second sonar transmitter 25 transmitting an acoustic wave 26.

On account of the positioning of the transmitters on different hulls, the transmission sources are situated spaced apart by a distance A whose value is substantially greater than the wavelength transmitted by each of the transmitters. Now, it is known that the operation of such an assembly is similar to that of a transmitter whose radiation pattern comprises a useful lobe oriented in the direction of transmission and spurious lobes exhibiting spatial periodicity. This periodicity is dependent on the ratio of the distance separating the two transmitters to the wavelength transmitted. The detection of an object is then marred by an ambiguity in the position of this object.

To avoid the problems related to the presence of spurious lobes, the device according to the invention, in the preferred embodiment, comprises transmitters 23 and 25 transmitting on acoustic waves of different forms or frequencies. The signals originating from each of the transmitters are thus easily differentiated on reception.

On one of the two hulls, the hull 211 for example, is also positioned a sonar receiver 29 whose reception band covers those occupied by the waves 24 and 26.

The principle of operation of the assembly constituted by the transmitters and the receiver can be described in a simple manner as follows.

Each time that an object is situated in the zone covered by the two sonar transmitters, it returns an echo which is sensed by the receiver. This echo is demarcated by a reflected wave 28 which results from the reflection of the incident waves 24 and 26 on the object. After reception, the reflected signals arising from the incident wave 24 and those arising from the incident wave 26 are processed so as to determine precisely and rapidly the position with respect to the ship of the object having returned an echo.

FIG. 2 illustrates the particular case where the device according to the invention is used on a ship comprising two hulls. It is of course possible to extrapolate this example to a ship for example comprising three hulls. In this case the receiver can be carried by one of the hulls already carrying a transmitter or else by the hull not carrying any transmitter. The general principle of operation remains unchanged.

Figure 3:
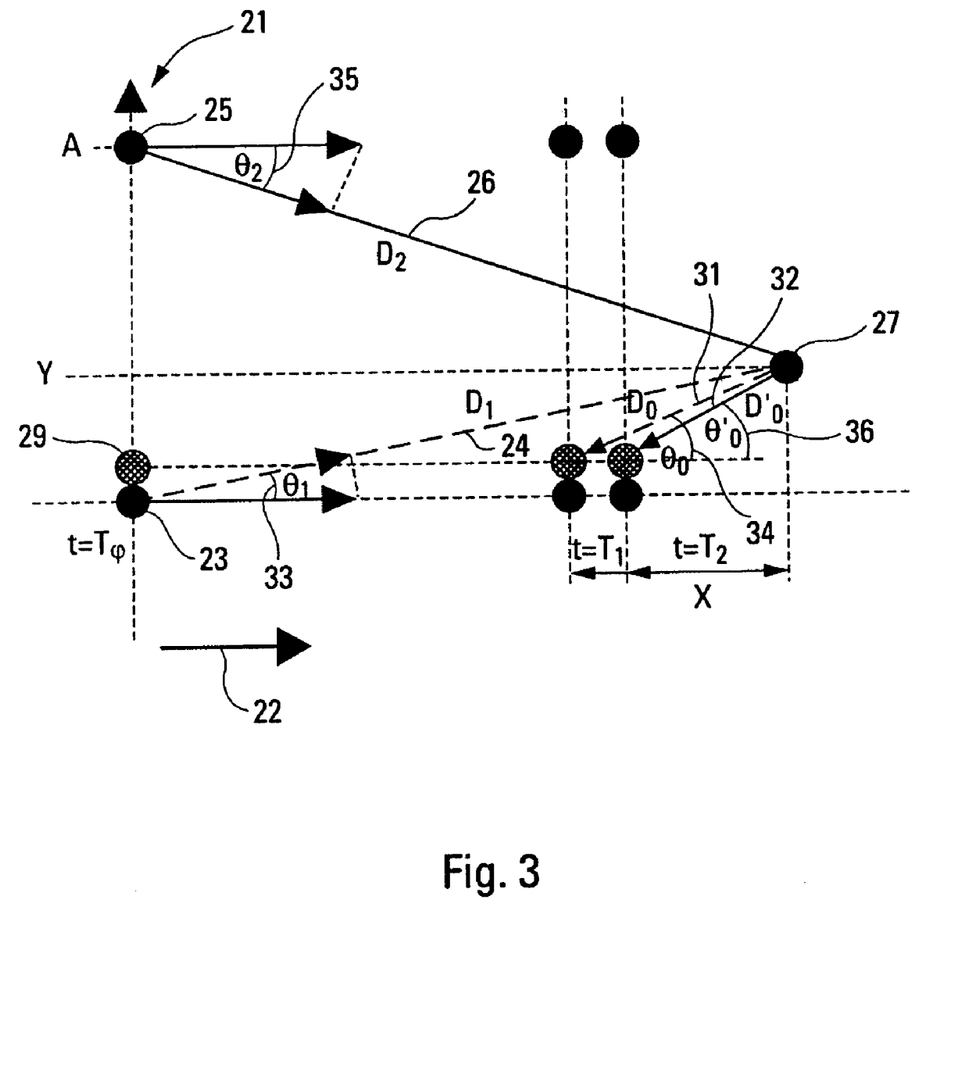
FIG. 3, a diagram illustrating the principle of operation of the device according to the invention.

FIG. 3 makes it possible to illustrate the principles of operation of the device according to the invention.

According to the invention, the determination of the position of a floating or slightly submerged object situated on the route followed by the ship, can be carried out in two stages. In a first stage, when the object is still sufficiently far from the ship, the position of the object forms the subject of a coarse determination carried out by analysis of the difference between the respective times of arrival of the waves received by reflection on the object of the waves transmitted by each of the transmitter. Then in a second stage the position of the object is determined in a more precise manner by analyzing the difference of the Dopplers affecting the waves received.

These two ways to determine the position of the object are set forth subsequently in the document.

In FIG. 3, the ship 21 is represented symbolically by the three disks 23, 25 and 29, at various instants $T_0$, $T_1$ and $T_2$ of its progression along a direction 22. FIG. 3 also exhibits an object 27 situated on the route of the ship.

Let $D_1$ and $D_2$, be the radial distances separating respectively at the instant $T_0$ the object from the transmitters 23 and 25 with which the ship is equipped. So as to clarify the account the propagation medium is assumed to be isotropic and isospeed. If we call C the propagation speed of the sound waves in the medium considered. Taking account of the displacement of the ship it is possible to write:

$$T_1 = T_0 + D_1/C + D_0/C \quad [3]$$

and $$T_2 = T_0 + D_2/C + D'_0/C \quad [4]$$

where $T_1$ and $T_2$ represent the instants of arrival at the level of the receiver of the echos 31 and 32 reflected by the object 27. These echos are consequent on the synchronous transmission at the instant T0 of the waves 24 and 26 by the two transmitters 23 and 25. $D_0$ and $D'_0$ represent for their part the radial distances separating the object from the ship at the instants $T_1$ and $T_2$. The angles 33 and 35 represent the angles made by the directions of the waves transmitted by the transmitters, with the axis of displacement of the ship taken for example as reference. Likewise, the angles 34 and 36 represent the angles made by the directions of the waves received by the receiver with the same reference axis.

The distances D1 and D2 which separate at the instant $T_0$ the object returning an echo from each transmitter, are distinct. They are dependent on the relative positions of the object and of the ship at $T_0$. Two waves transmitted simultaneously at $T_0$ by each of the transmitters hence do not reach the object at the same instant and are received by the receiver, after reflection on the object, at different instants.

Moreover, on account of the speed of displacement of the ship, the relative positions of the object with respect to the receiver varies between the instants $T_1$ and $T_2$ of reception of the waves reflected by the object. The paths $D_0$ and $D'_0$ traveled by the reflected waves are hence also different.

The difference $(T_2-T_1)$ is hence at one and the same time dependent on the position of the object with respect to the ship and the speed of displacement of the ship.

If we consider moreover that the distance between the ship and the object does not vary substantially during the measurement, the paths $D_0$ and $D'_0$ can be merged. The knowledge of the values $T_1$ and $T_2$, or else of the value of the deviation $(T_2-T_1)$, is then sufficient to determine by known means, not described in this document, the position of the object with respect to the ship. On the other hand, in the case of a high-speed ship the paths $D_0$ and $D'_0$ may not strictly speaking be merged. Even, if the distance separating the object 27 from the ship 21 is large, for example greater than 1 km, the displacement of the ship during the journey of the sound waves in the water may not be neglected and it is possible to write:

$$D_1 > D_0 \text{ and } D_2 > D'_0 \quad [5]$$

The deviation $(T_2-T_1)$ then depends to a large extent on the deviation $(D_2-D_1)$ and to a lesser extent on the deviation $(D_0-D'_0)$. Thus, if we put $T_0=0$, it is possible to write:

$$D_1^2 = (X + V \cdot T_1)^2 + Y^2 \quad [6]$$

$$D_2^2 = (X + V \cdot T_2 - V(T_2 - T_1))^2 + (A - Y)^2 \quad [7]$$

$$D_0^2 = X^2 + Y^2 \quad [8]$$

$$D'_0{}^2 = (X - V \cdot (T_2 - T_1))^2 + Y^2 \quad [9]$$

If we consider that the object is situated at a large distance from the ship, it is possible to consider that $T_2 - T_1 \# (D_2 - D_1)/$ C, V remaining small in regard to C even for high-speed ships, progressing for example at a speed of 50 knots. It is then possible to simplify the previous relations as follows:

$$D_1^2 \# (X+V \cdot T_1)^2 + Y^2 \quad [10]$$

$$D_2^2 \# (X+V \cdot T_2)^2 + (A-Y)^2 \quad [11]$$

$$D_0^2 = X^2 + Y^2 \# D'_0{}^2 \quad [12]$$

The measurements of the values $T_1$ and $T_2$ or of the difference $(T_2-T_1)$ are then sufficient to satisfactorily determine the coordinates X and Y of the object.

In a graphical manner these coordinates X and Y determine the intersection of two ellipses. One of the ellipses corresponds to the location with respect to the receiver of the points for which the propagation time of a wave transmitted by the transmitter 1 corresponds to $T_1$. The other ellipse corresponds to the location with respect to the receiver of the points for which the propagation time of a wave transmitted by the transmitter 2 corresponds to $T_2$.

To render the measurement of the values $T_1$ and $T_2$ easier, the device according to the invention advantageously uses, in the preferred embodiment, two distinct acoustic emissions exhibiting different frequencies $F_1$ and $F_2$ or else different forms. Thus the start-of-transmission instant $T_0$ being identical, the receiver can readily, for example by filtering, separate the received signals corresponding to the same echo with the aid of their frequency and determine the instants of reception $T_1$ and $T_2$ of the signals arising respectively from the transmitters 23 and 25.

Thus, when the object is situated at a relatively large distance from the ship, the principle of determination based on the measurement of the deviation $(T_2-T_1)$ makes it possible to determine in a relatively simple manner the position of the object with respect to the ship. Having regard to the distance separating the ship, the position of the object is determined with sufficient accuracy.

On the other hand, as soon as the detection of the object is carried out in the near field this principle of determination based only on the measurement of the difference $(T_2-T_1)$ turns out to be too inaccurate to allow safe navigation. The approximation consisting in identifying $D'_0$ with $D_0$ is no longer acceptable. This inaccuracy is furthermore all the more penalizing as the objects are then situated at a distance close to the ship. The time-span available to operate an avoidance maneuver is then very short. Recall in this regard that operation in the near field must be understood here to mean a case of operation for which the distance D between the object and the ship is small and the ratio A/λ is large. A and λ respectively represent the distance separating the two transmitters and λ the length of the signal.

Insofar as the object is closer to the ship, the growth in the influence of the Doppler effect related to the significance of the variations between the angles of emission 33, 35 and of reception 34, 36 prevents any simplifying approximation making it possible to determine the position of the object by simply using the measurement of $T_1$ and $T_2$ or of the difference $(T_2-T_1)$. Moreover, the implementation of non-coherent processings using, for example the measurement of the energy received, is not conceivable either. This kind of processing would lead to the generation of numerous false alarms deriving in particular from the consideration of volume or surface reverberation phenomena.

To deal with the problem engendered by the detection of objects in the near field, the device according to the invention implements a different processing from that set forth previously and which associates the utilization of the measurement of the delay $(T_2-T_1)$ with a utilization of the Doppler effect which affects the signals received. Specifically, as a function of the relative position of the detected object with respect to both the transmitters the signals transmitted by the two transmitters 23, 25 and reflected by the object are affected by different frequency shifts. The processing implemented consists hence in determining on the basis of a frequency analysis of the received signals the position of the object by using the differential Doppler frequency. This determination can be done by various known means.

The determination of the differential Doppler frequency advantageously makes it possible to know the variation in the position of the ship between the instants $T_1$ and $T_2$. Associated with the knowledge of V, as shown by relations [6] to [9], it allows the exact determination of the coordinates X and Y of the object. V may be known moreover or estimated conventionally by means of the Doppler effect. The principle of the determination of the differential Doppler frequency according to the invention is described in the following paragraphs.

If we consider for reasons of clarity of the account that the object which returns an echo is immobile or at least imbued with a very low inherent speed, the relation linking the differential Doppler frequency to the position of the object having returned an echo can be established in a simple manner.

The two transmitters being synchronized and transmitting for example signals of respective frequencies $F_1$ and $F_2$, the signals sensed by the receiver and originating from the reflection by the object of the transmitted signals, will be received at frequencies $Fr_1$ and $Fr_2$ such that:

$$F_{r1} \cong F_1[1+V/C \cdot (\cos\theta_1 + \cos\theta_0)] \quad [13]$$

and $$F_{r2} \cong F_2[1+V/C \cdot (\cos\theta_2 + \cos\theta'_0)] \quad [14]$$

Where $\theta_1$, $\theta_2$, $\theta_0$ and $\theta'_0$ correspond respectively to the incident and reflected angles 33, 35, 34 and 36 of FIG. 3. These angles are dependent on the coordinates X and Y of the object.

The frequency shifts between transmitted and received signals are related to the speed of the ship which causes the relative position of the ship with respect to the object to vary.

If the differential delay $(T_2-T_1)$ corresponding to the time deviation separating the instants of reception of the echos originating from the object is compensated and if the intercorrelation of the received signals corresponding to the same instant of emission is performed, we obtain a signal of the form:

$$C(t) = \tfrac{1}{2} A_1 \cdot A_2 \cdot [\cos(2\pi\Delta F_r \cdot t) + \cos(2\pi\Sigma F_r \cdot t)] \quad [15]$$

The signal obtained advantageously comprises the two frequency components:

$$\Delta F_r = F_{r1} - F_{r2} \quad [16]$$

and $$\Sigma F_r = F_{r1} + F_{r2} \quad [17]$$

It is thereafter possible, by applying a "low-pass"-type filtering and a filtering of high-pass type, to insulate the frequency components $\Delta F_r$ and $\Sigma F_r$.

If on the other hand we call $Vr_1$ and $Vr_2$ the projections of the speed of the ship along $D_1$ and $D_2$, on the basis of relations [13] and [14] it is possible to write:

$$Fr_1 = F_1\left[1 + \frac{Vr_1}{C} + \frac{V}{C}\cos\theta_0\right] \quad [18]$$

$$Fr_2 = F_2\left[1 + \frac{Vr_2}{C} + \frac{V}{C}\cos\theta'_0\right] \quad [19]$$

from which we derive:

$$Vr_1 = C \cdot \left[Fr_1 - F_1\left(1 + \frac{V}{C}\cos\theta_0\right)\right]/F_1 \quad [20]$$

$$Vr_2 = C \cdot \left[Fr_2 - F_2\left(1 + \frac{V}{C}\cos\theta'_0\right)\right]/F_2 \quad [21]$$

we thus obtain:

$$F_1 \cdot Vr_1 - F_2 \cdot Vr_2 = C \cdot (\Delta Fr - \Delta F) - F_1 \cdot V \cos\theta_0 + F_2 \cdot V \cos\theta'_0 \quad [22]$$

$$F_1 \cdot Vr_1 + F_2 \cdot Vr_2 = C \cdot (\Sigma Fr - \Sigma F) - F_1 \cdot V \cos\theta_0 - F_2 \cdot V \cos\theta'_0 \quad [23]$$

Relations [22] and [23] thus make it possible, if we know the transmission frequencies $F_1$ and $F_2$, to determine the values of the differential Doppler frequency given by the expression:

$$\Delta f_d = \Delta Fr - \Delta F \quad [24]$$

with $\Delta Fr = Fr_2 - Fr_1$ and $\Delta F = F_2 - F_1$

The differential Doppler frequency, image of the speed V, appears as being dependent on the angles $\theta_0$, $\theta'_0$, $\theta_1$ and $\theta_2$. It is hence possible by determining the value of the differential Doppler frequency $\Delta f_d$, to determine $\theta_0$, $\theta'_0$, $\theta_1$ and $\theta_2$, and hence to determine the coordinates X and Y of the object 27 having returned an echo. This determination can be done by any known procedure.

In the case of the device according to the invention, according to the preferred embodiment, the implementation of the frequency analysis of the received signal is advantageously facilitated by the use of two different acoustic transmission frequencies $F_1$ and $F_2$. On reception, if is then easy to separate by filtering the signal arising from the transmitter 23 from that arising from the transmitter 25 and to separately perform the frequency analysis of each of the signals. This frequency analysis makes it possible to determine the Doppler frequency of each signal and to calculate the differential Doppler frequency.

The use of other signal classes is possible and may turn out to be advantageous for certain applications, these signals can then be chosen as a function of the properties of their ambiguity function which characterizes their ability to allow a discrimination in terms of delay and Doppler.

It is useful to note that the use of the differential Doppler frequency $\Delta f_d$ to determine the position of a the object being situated in a close zone with respect to the ship, can also be used when the object is situated at a more significant distance.

The illustration of FIG. 3 exhibits the device according to the invention in a configuration comprising two transmitters spaced apart from one another and a receiver. Of course, on account of the reciprocity of the properties used it is possible to implement the principle for determining the position of a floating object set forth above by using a device comprising a single transmitter simultaneously transmitting two waves of different frequencies and two receivers distant from one another, each receiver having a passband suitable for one of the transmission frequencies.

Figure 4:
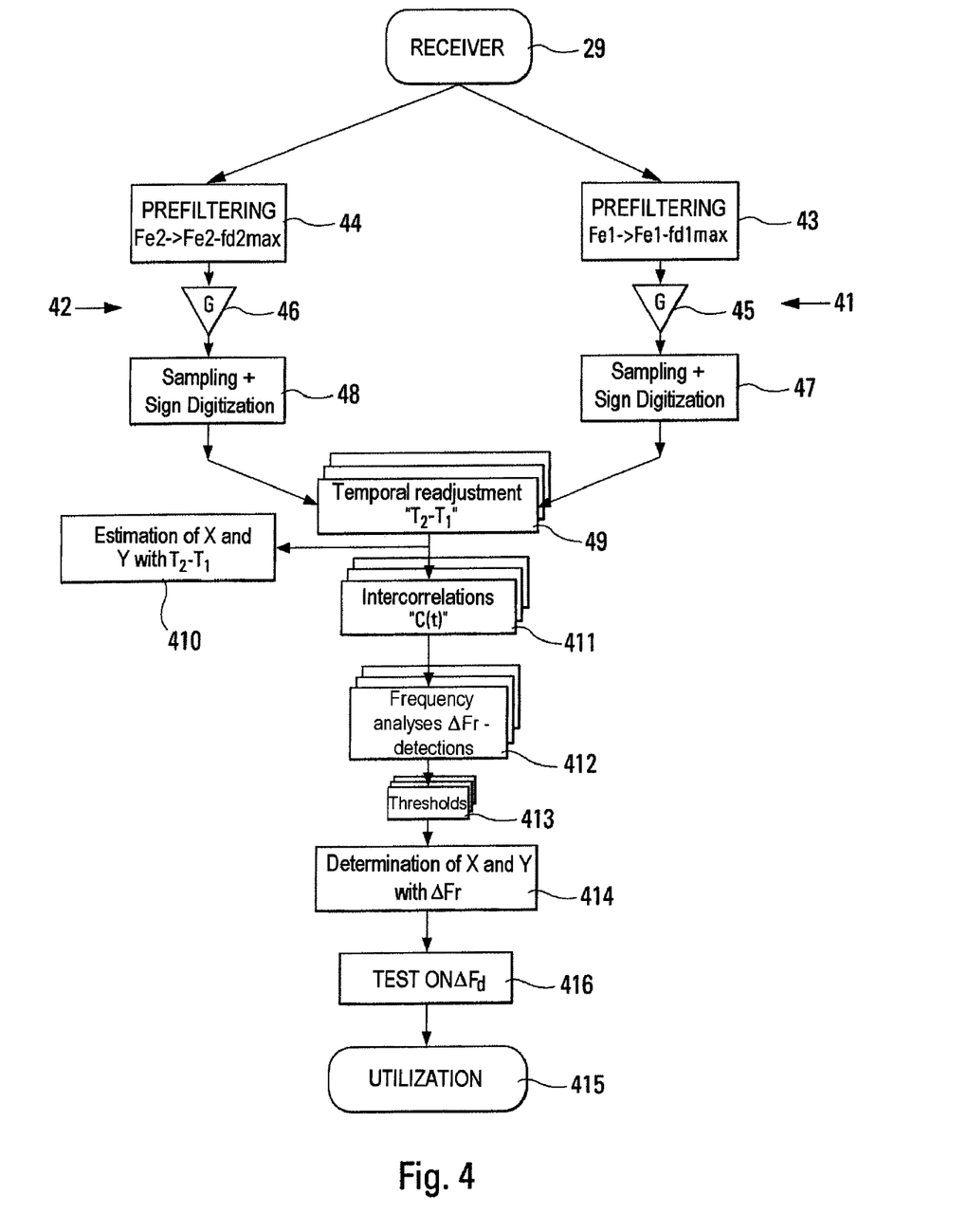
FIG. 4, a diagram illustrating the steps of an exemplary method that can be implemented by the device according to the invention so as to determine the position of an object.

FIG. 4 presents by way of example, the basic diagram describing the steps of a method making it possible to determine the position of a floating object with respect to a ship equipped with the device according to the invention. This method comprises various steps.

At the output of the receiver 29 the received signal is distributed over two parallel processing tracks 41 and 42. The processing track 41 comprises a prefiltering step 43 intended to preserve only the component of the received signal whose spectrum is centered on the transmission frequency Fe1 of the first transmitter 23. The signal processed by the track 41 thus corresponds to the signal arising from the transmitter 23 reflected by the object 27.

In parallel, in the processing track 42, the received signal undergoes a prefiltering operation 44 intended to preserve only the component of the received signal whose spectrum is centered on the transmission frequency Fe2 of the second transmitter 25. The signal processed by the track 42 thus corresponds to the signal arising from the transmitter 25 reflected by the object 27. The filtered signal thereafter undergoes a gain correction operation 46 as well as a sampling and digitization operation 48.

The digital signals thus obtained form the subject of an operation 49 of temporal readjustment followed by an intercorrelation 411. The temporal readjustment is aimed at resynchronizing the signals received by the receiver, to reharmonize the signals reflected by the detected object which originate from signals transmitted at the same instant by the two transmitters 23 and 25. This temporal readjustment is for example carried out by applying to the signal of one of the processing tracks 41 or 42 a set of delays, each delay corresponding to a value of the difference of path length of the acoustic waves transmitted by the two transmitters and reflected by the object. The operation of temporal readjustment can give rise to an operation 410 of coarse determination of the coordinates X and Y of the object, on the basis of the value $T_2 - T_1$ determined. This first determination does not take into account the speed V of the ship.

The operation 411 thereafter performs the intercorrelation of the signals of each of the tracks for each of the delays applied. We thus obtain signals C(t) whose general form can be expressed by relation [15].

The signals obtained thereafter form the subject of operations 412 of frequency analysis whose aim is in particular to determine for each intercorrelation result the values $\Delta Fr$ for which a signal is detected. The level of the spectral component arising from each analysis can form the subject, as mentioned in the figure, of a comparison 413 with a detection threshold. The corresponding values $\Delta Fr$ gives rise to the operation 414 for determining the position of the detected object. This operation consists for example in calculating the coordinates X and Y of the object by taking into account the speed V of the ship, V being determined on the basis of $\Delta Fr$ according to a known procedure. These coordinates give rise to a utilization 415. The latter can consist of a display on a console for an operator thus able to decide the threat that the object represents or of a use by a monitoring and automatic avoidance device.

In order to avoid the occurrence of a large number of false alarms, the method can furthermore comprise an operation 416 consisting of a test of the values $\Delta F_d$ calculated on the basis of the values $\Delta Fr$ leading to the rejection of the points for which $\Delta F_d$ does not correspond to a differential Doppler frequency deemed plausible. The test can for example consist of a comparison of the value $\Delta F_d$ calculated with the values held in a table.

Figure 5:
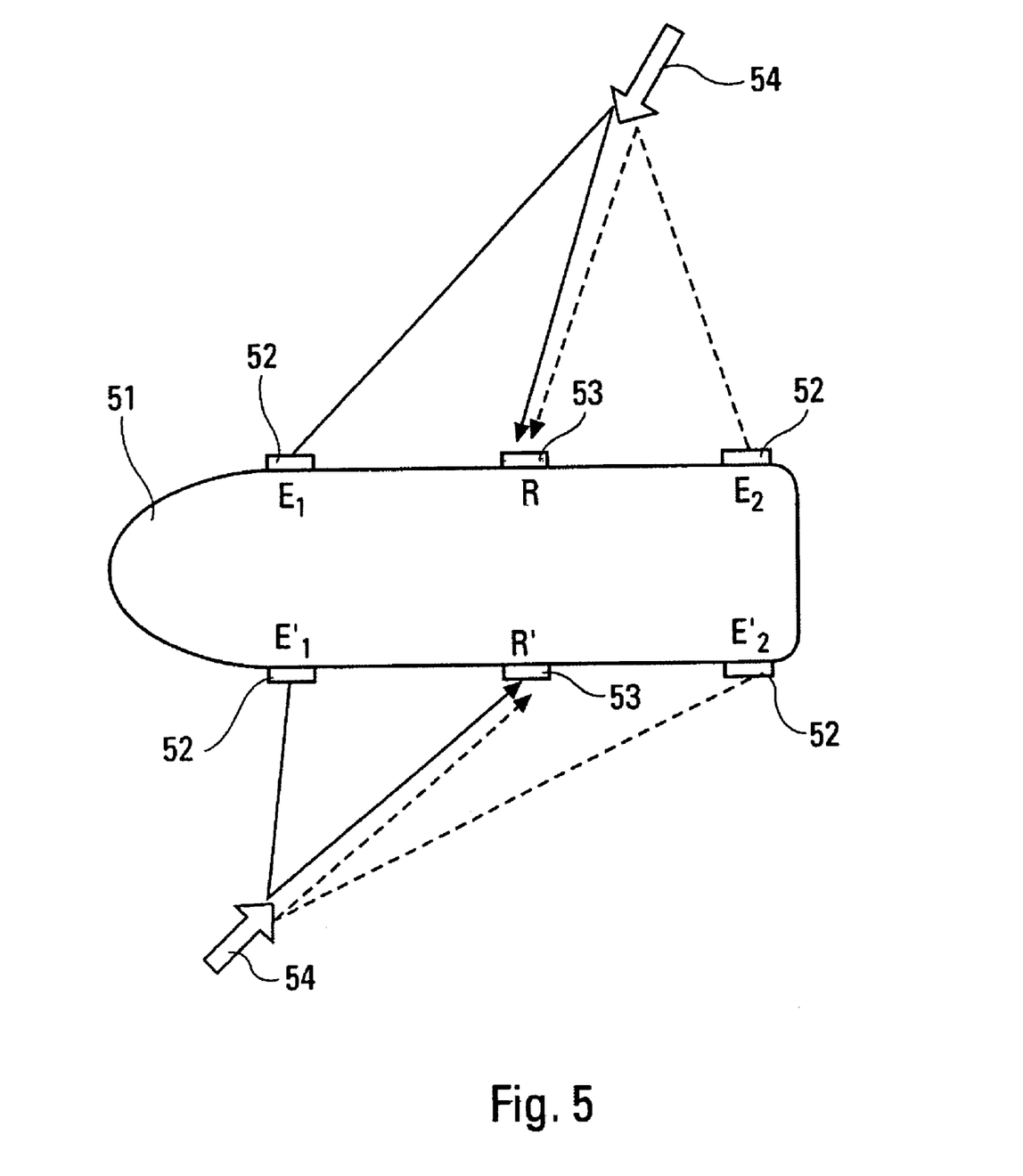
FIG. 5, an illustration of a particular exemplary use of the device according to the invention.

The device according to the invention hence affords a solution to the problem posed by the detection of floating or slightly submerged objects, placed on the route of ships and in particular of high-speed ships of catamaran type. These objects can impede the displacement of a ship or even damage it. However, as illustrated in FIG. 5, it can be employed by slower ships, having significant inertia. In this context it makes it possible to detect in an early manner the approach of fast objects 54, so as to be able to avoid them. For such a use, a device according to the invention for example comprising two transmitters 52 placed at the ends and a receiver 53 placed at the center, is installed on each of the edges of the ship 51.

The device according to the invention such as described here is an element onboard a ship and intended to determine the position of an object situated on its route. However, in an analogous manner, it can be set up on a fixed installation such as a fairway for access to a port for example, so as to control the good positioning of a ship approaching and wishing to enter this fairway.

The invention claimed is:

1. An avoidance device for a ship, allowing said ship to avoid floating or slightly submerged objects situated on a route of the ship or in a zone close to said route, comprising:
   two transmitters of acoustic waves spaced apart from one another;
   an acoustic receiver, whose reception band is suitable for the transmission frequencies of the transmitters, said receiver being configured to receive echoes resulting from the reflection of the signals transmitted by each of the transmitters;
   means of processing of the received signals, said processing means performing, from the echoes received, a measurement of the difference of the propagation times of the waves transmitted by each of the transmitters after reflection of the waves by an object as well as a measurement of the Doppler effect which affects each of the transmitted waves; said processing means implementing a process for determining the position of said object comprising the two following stages;
   a first stage, during which a coarse determination of the position of the object is carried out by calculation of the difference $(T_2-T_1)$ of the propagation times of the waves;
   a second stage during which the position of the object is determined in a more precise manner by calculation of the differential Doppler frequency $\Delta f_d$ of the waves from the frequencies $F_1$ and $F_2$ transmitted by the transmitters, and from the frequencies $Fr_1$ and $Fr_2$ received by the receiver, said differential Doppler frequency $\Delta f_d$ being defined by the following relation;

$\Delta f_d = \Delta Fr - \Delta F$ wherein $\Delta Fr = Fr_2 - Fr_1$ and $\Delta F = F_2 - F_1$.

2. The device as claimed in claims 1, wherein said two transmitters emit waves of distinct frequencies or of different waveforms.

3. An avoidance device for a ship, allowing said ship to avoid floating or slightly submerged objects situated on a route of the ship or in a zone close to said route, comprising at least:
   one transmitter of acoustic waves transmitting two waves each wave having a different frequency or waveform from the other;
   two acoustic receivers spaced apart from one another, the reception band of each receiver being suitable for one of the tranmission frequencies of the transmitter, said receivers being configured to receive echoes resulting from the reflection of the signals transmitted the transmitters;
   means of processing of the received signals, these means performing, from the echoes received, a measurement of the difference of the propagation times of the waves transmitted by each of the transmitters after their reflection by an object as well as a measurement of the Doppler effect which afftects each of the transmitted waves; said processing means implementing process for determining the position of said object comprising the two following stages:
   a first stage, during which a coarse determination of the position of the object is carried out by calculation of the difference $(T_2-T_1)$ of the propagation times of the waves;
   a second stage during which the position of the object is determined in a more precise manner by calculation of the differential Doppler frequency $\Delta f_d$ of the waves from the frequencies $F_1$ and $F_2$ transmitted by the transmitters, and from the frequencies $Fr_1$ and $Fr_2$ received by the receiver, said differential Doppler frequency $\Delta f_d$ being defined by the following relation;

$\Delta f_d = \Delta Fr - \Delta F$ wherein:

$\Delta Fr = Fr_2 Fr_1$ and $\Delta F = F_2 = F_1$.

4. A multihull ship comprising a device as claimed in claim 1, the two transmitters of acoustic waves being disposed on different hulls and the acoustic receiver disposed on any one of the hulls.

5. A multihull ship comprising a device as claimed in claim 3, the two receivers of acoustic waves being disposed on different hulls and the acoustic transmitter being disposed on any one of the hulls.

6. A detection and avoidance system for a ship, said system permitting said ship to detect and avoid objects approaching at a high speed, said system comprising devices according to claim 1, one device being mounted on each side of the said ship.

7. A ship positioning control system, for controlling the passage of a ship through a port comprising at least one device according to claim 1, said device being positioned at an opening of said port.

8. A detection and avoidance system for a ship, said system permitting said ship to detect and avoid objects approaching at a high speed, said system comprising devices according to claim 3, one device being mounted on each side of said ship.

9. A ship positioning control system, for controlling the passage of the ship through a port comprising at least one device according to claim 3, said device being positioned at an opening of said port.

* * * * *